US006060011A

United States Patent [19]
Zandvliet et al.

[11] Patent Number: 6,060,011
[45] Date of Patent: May 9, 2000

[54] METHOD FOR ENCLOSING AN OBJECT WITH A TRANSPARENT ENCAPSULATION

[75] Inventors: Johannes Maria Zandvliet, JD Beets; Rene Cornelis Malherbe de Juvigny, TM's-Hertogenbosch, both of Netherlands

[73] Assignee: Standard Group Holding B.V., Wassenaar, Netherlands

[21] Appl. No.: 09/101,534

[22] PCT Filed: Jan. 13, 1997

[86] PCT No.: PCT/NL97/00010

§ 371 Date: Oct. 29, 1998

§ 102(e) Date: Oct. 29, 1998

[87] PCT Pub. No.: WO97/25282

PCT Pub. Date: Jul. 17, 1997

[30] Foreign Application Priority Data

Jan. 12, 1996 [NL] Netherlands .......................... 1002074
Feb. 26, 1996 [NL] Netherlands .......................... 1002441
Mar. 29, 1996 [NL] Netherlands .......................... 1002739

[51] Int. Cl.⁷ .................................................. B29C 70/70
[52] U.S. Cl. ................................. 264/275; 65/48; 65/49; 65/DIG. 11; 264/271.1; 264/279.1
[58] Field of Search .................................. 65/23, 42, 48, 65/49, DIG. 11; 264/271.1, 272.12, 272.15, 275, 278, 279.1; 428/11, 13, 630, 67, 426; 273/161

[56] References Cited

U.S. PATENT DOCUMENTS

| | | | |
|---|---|---|---|
| 706,863 | 8/1902 | Shaffer | 65/48 |
| 1,879,676 | 9/1932 | Fulcher | 428/428 |
| 1,879,818 | 9/1932 | Krieg | 119/442 |
| 1,880,118 | 9/1932 | Allyn | 426/515 |
| 1,889,390 | 11/1932 | Throm | 65/48 |
| 2,073,254 | 3/1937 | Redman | 65/49 |
| 2,350,421 | 6/1944 | Schoder et al. | 264/255 |
| 3,207,514 | 9/1965 | Vickery | 427/126 |
| 3,254,979 | 6/1966 | Knapp et al. | 65/21.5 |
| 3,463,624 | 8/1969 | Labino | 65/71 |
| 3,489,545 | 1/1970 | De Bussy | 65/184 |
| 3,811,856 | 5/1974 | Ruszczyk et al. | 65/48 |
| 4,067,947 | 1/1978 | Miori | 264/154 |
| 4,116,439 | 9/1978 | Chavarria et al. | 473/52 |
| 4,182,737 | 1/1980 | Haber et al. | 264/135 |
| 4,260,405 | 4/1981 | Ambrogi | 65/42 |
| 4,278,626 | 7/1981 | Atanasovski | 264/40.1 |
| 4,396,192 | 8/1983 | Fitzpatrick | 473/53 |
| 4,584,212 | 4/1986 | Klein et al. | 428/13 |
| 4,643,693 | 2/1987 | Rubinstein | 446/267 |
| 4,809,417 | 3/1989 | Normann, Jr. | 29/896.41 |
| 5,688,567 | 11/1997 | Daulton | 428/11 |

FOREIGN PATENT DOCUMENTS

| | | |
|---|---|---|
| 1178558 | 5/1959 | France . |
| 2324470 | 5/1977 | France . |
| 2683183 | 5/1993 | France . |
| 3726022 | 2/1989 | Germany . |
| 8905796-U1 | 8/1989 | Germany . |
| 90/11481 | 10/1990 | WIPO . |

*Primary Examiner*—Sean Vincent
*Attorney, Agent, or Firm*—Webb Ziesenheim Logsdon Orkin & Hanson, P.C.

[57] ABSTRACT

A method for enclosing an object with a spherical, transparent encapsulation of glass or like hard and scratch-resistant material includes the following steps, to be performed in suitable sequence, of: providing the object having a degradation temperature; arranging this object in a cavity; providing an encapsulating material around this object which melts at a temperature lower than the degradation temperature; carrying the object by a support of transparent material which melts at a temperature lower than the degradation temperature and which is substantially homogeneously fusable with the encapsulating material; and causing this encapsulating material to cure to a transparent encapsulating mass.

13 Claims, 2 Drawing Sheets

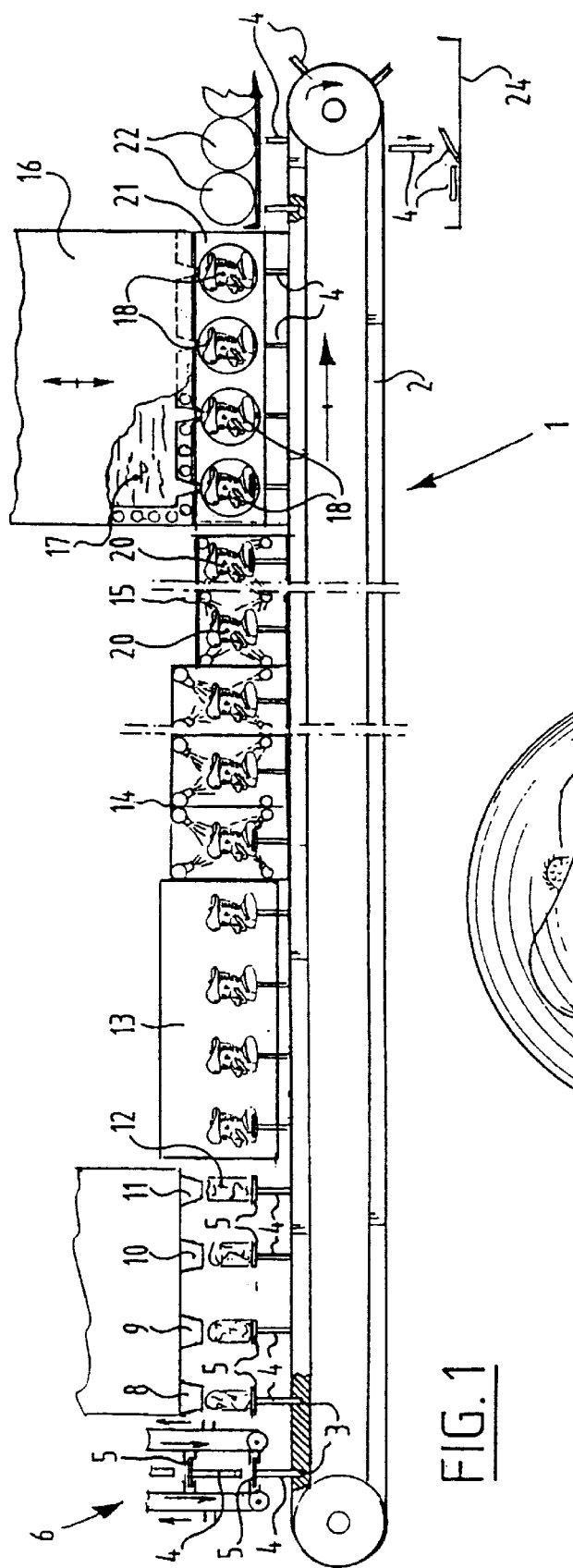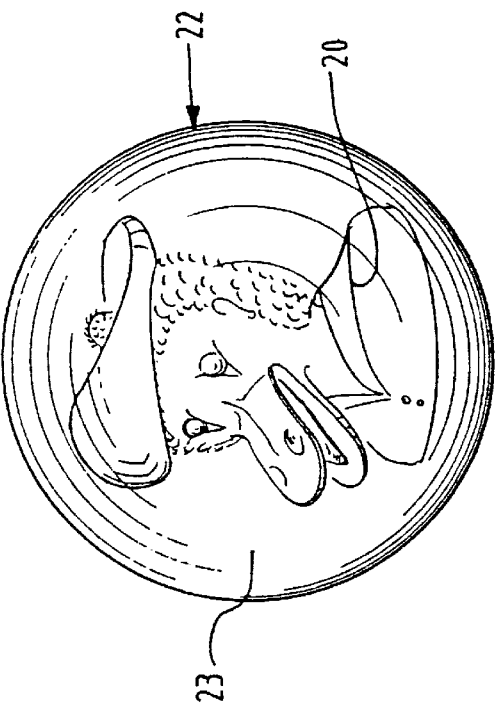

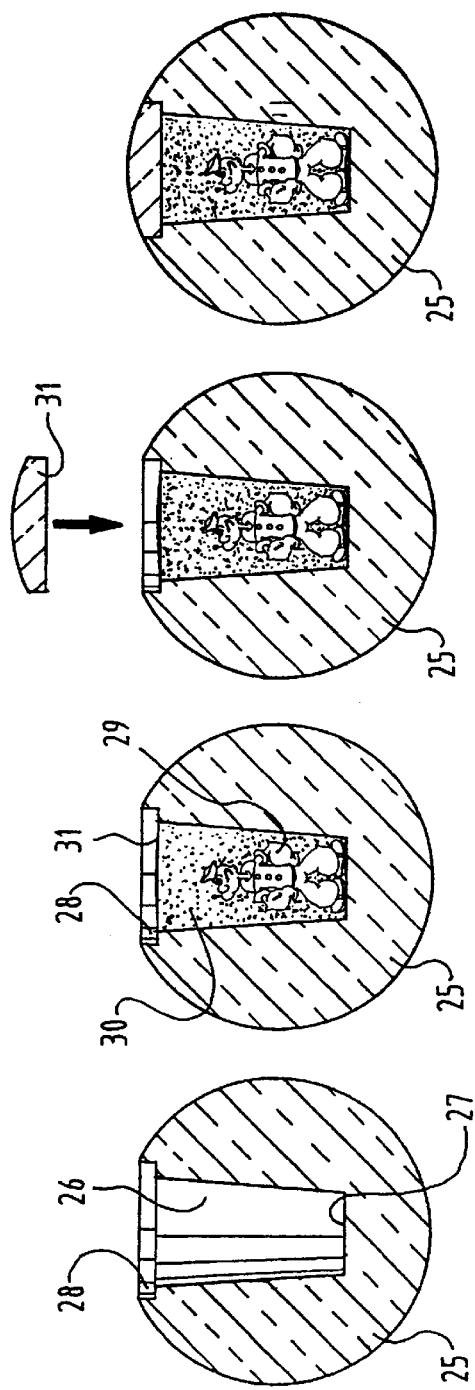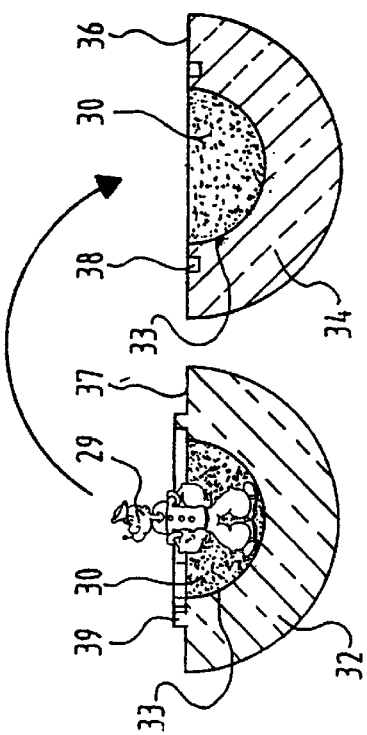

METHOD FOR ENCLOSING AN OBJECT WITH A TRANSPARENT ENCAPSULATION

BACKGROUND OF THE INVENTION

The invention relates to a method for enclosing an object with a transparent encapsulation.

Such a method is known from e.g. FR-A-1 178 558.

It is a purpose of the invention to provide a method, in which the product eventually obtained and consisting of an object enclosed with a transparent encapsulating, has a spherical shape. It is furthermore an object of the invention to provide a method, carrying out which a high degree of positioning accuracy of the object relative to the spherical encapsulating is ensured.

SUMMARY OF THE INVENTION

In view of the above objectives the invention provides a method for wholly enclosing an object (20) with a spherical, transparent encapsulation (23), comprising the following steps of:

(a) providing an object (20) which has a degradation temperature, for instance the temperature at which at least a part of the object (20) substantially softens, melts or otherwise degenerates in possibly reversible manner;

(b) arranging the object (20) in a spherical mould cavity (19), the shape of which corresponds with the desired spherical shape of the encapsulation (23);

(c) providing a transparent encapsulating material (17) which melts at a melting temperature lower than said degradation temperature;

(d) causing the encapsulating material (17) to melt by heating and carrying thereof into the mould cavity (19);

(e) causing the encapsulating material (17) to cool to below the melting temperature;

(f) opening the mould cavity (19) and removing the solidified spherical moulded article (22);

wherein prior to step (d) the object (20) is carried by a support (4,5) consisting of a transparent material which melts at a melting temperature lower than said degeneration temperature and which can fuse substantially homogeneously with the encapsulating material (17) during step (d).

For a method, in which the encapsulating material (17) is glass, it is noted that the melting temperature of glass is in the order of a magnitude of 600–800° C. Glass is normally processed in plastic state at a temperature of 1200° C. The object enclosed by the glass mass must have a higher degradation temperature.

This latter can be achieved easily with an embodiment wherein step (a) is performed with an object of ceramic material, which can optionally be at least partly covered with an optionally coloured coating, for instance of enamel or glazing.

An alternative has the special feature that step (a) is performed with an object of metal which can optionally be at least partly covered with an optionally coloured coating, for instance of enamel or glazing.

Very inexpensive, simple and practical to perform on a large scale is the method wherein step (a) is performed with an object of aluminium which is optionally anodized in one or more colours.

The obtained products are transparent spheres which have at least a glass jacket. These spheres can particularly have dimensions such that they are suitable as children's toys, particularly for use as marbles.

As already noted above, the use of glass for instance for marbles is per se known. Glass has the great advantage of being a hard and therefore scratch-resistant material, whereby the spherical moulded articles are mechanically not very vulnerable.

Another method as described above for wholly enclosing an object with a spherical, glass, transparant encapsulation comprises the following steps:

(f) providing an object which has a degradation temperature, for instance the temperature at which at least a part of the object substantially softens, melts or otherwise degenerates in possibly reversible manner;

(g) arranging the object in a spherical mould cavity, the shape of which corresponds with the desired spherical shape of the encapsulation;

(h) providing a transparent encapsulating material which melts at a melting temperature lower than said degradation temperature;

(i) causing the encapsulating material to melt by heating and carrying thereof into the mould cavity;

(j) causing the encapsulating material to cool to below the melting temperature; and (k) opening the mould cavity and removing the solidified spherical moulded article.

A specific embodiment has the special feature that prior to step (i) the object is carried by a support consisting of a transparent material which melts at a melting temperature lower than said degeneration temperature and which can fuse substantially homogeneously with the encapsulating material during step (i).

This method can be carried out in particular such that the support consists of glass.

Finally, the invention relates to a spherical product obtained with a method according to the invention. This product consists of an object enclosed with a glass encapsulation.

The encapsulation itself can be without colour or coloured. In this respect the term "transparent" must therefore not be specifically understood to mean a non-coloured mass.

An object can for instance comprise a three-dimensional representation of one or more comic or cartoon figures. This can be very attractive, particularly when the products according to the invention are used as children's toys.

BRIEF DESCRIPTION OF THE DRAWINGS

The invention will now be elucidated with reference to the annexed drawings. Herein:

FIG. 1 shows a partly broken-away, schematic side view of a device for performing the method according to the invention;

FIG. 2 shows a side view of a spherical marble according to the invention which is manufactured with the device of FIG. 1;

FIGS. 3a, 3b, 3c and 3d show schematically in cross section respective stages progressed through in a specific method according to the invention; and FIGS. 4a, 4b and 4c show views corresponding with FIG. 3 of another embodiment.

DESCRIPTION OF THE PREFERRED EMBODIMENTS

FIG. 1 shows a device 1 comprising an endless conveyor belt 2 which has blind holes 3 on its outer surface, into which fit glass stems 4. These stems 4 each carry a platform 5. A feed device 6 successively places one glass stem 4 bearing a platform 5 at a time into a blind hole 3 at the beginning of the active part of conveyor belt 2. A clay supply station 7 successively feeds a mass of clay 12 to the platforms 5 present thereunder via four nozzles 8, 9, 10, 11. In a moulding station 13 the clay masses 12 are formed into the desired shape. In the station 14 the formed clay masses are heated and provided with colour glazing in various colours. In a subsequent heating station 15 a heating takes place to high temperatures such that the clay hardens to a ceramic mass and the glaze coating can dry and harden.

In a subsequent encapsulating station 16 preheated, molten glass 17 is supplied via nozzles 18 to spherical mould cavities 19, which are closed after the pre-baked and coloured ceramic objects 20 are placed in the respective mould cavities, still carried by the glass stems 4. Through the thermal contact of the mass 17 of molten glass with the glass platforms 5, these platforms also melt to become an integral part of the moulded glass encapsulation.

After cooling of the glass mass to below the melting temperature, the spherical moulded articles are ready, the mould 21 with the mould cavities can be opened and the moulded articles 22 can be removed for further transport and to be packed for dispatching.

The remaining parts of the glass stems 4 still present at the end of the active part of the conveyor belt 2 fall out of the blind holes 3 under the influence of the force of gravity and are collected in a collection tank 24. The material is suitable for re-use.

FIG. 2 shows on enlarged scale a moulded article or product 22 according to the invention. The ceramic object 20 is completely embedded in a spherical mass 23 of transparent glass.

It is pointed out emphatically that the device according to FIG. 1 is only intended to show which process steps could be used to implement the method according to the invention in order to obtain the product according to the invention. In order to show the process sequence the entire process is represented as if it can be carried out by successive stations along one endless conveyor belt. In practice it will not be possible to make use of one conveyor belt in connection with the different necessary treatment times in the different stations. In particular the pre-heating in station 14 and heating in station 15 are steps requiring quite a considerable period of time.

A spherical outer surface of the transparent encapsulation not only has the advantage of a regular optical image of the embedded object in contrast to for instance a regular polyhedron, the structure of the outer surface of a football, or the like, but also that an embedded object can be optically enlarged in substantially homogeneous manner. The embedded object can hereby be comparatively small.

FIG. 3a shows a glass object 25 with a part-spherical form. The object could be described as a glass sphere into which a blind cavity 26 has been recessed. In this embodiment the cavity 26 has a shape tapering slightly toward its bottom 27. This tapering form facilitates release of the object 25 from the mould cavity. Situated at the top of cavity 26 is a step-like widening 28, the purpose of which will be explained hereinbelow.

FIG. 3b shows that an object in the form of a cartoon FIG. 29 is placed in cavity 26 and is embedded in a liquid two-component plastic embedding mass 30. This mass is introduced in a quantity such that the lower edge 31 of step 28 is situated just below the liquid surface. In the step 28 is then placed a glass cover 31 which fits precisely in the step 28. As shown in FIG. 3c, the outer surface of cover 31 has a shape corresponding with the spherical form of object 25 and complementary thereto. Due to the slight overmeasure of plastic in cavity 26 the plastic is able to adhere to the contact surfaces between step 28 and cover 31. A possible excess of plastic can easily be removed from the outside before the plastic has cured. FIG. 3d shows the finished object.

The plastic 30 is of a type having the same refractive index as the glass of object 25 and cover 31. The surfaces drawn in FIG. 3d with full lines are thereby wholly invisible.

FIG. 4a shows an embodiment wherein an object 32 takes the general form of a hemisphere with a spherical internal cavity 33 in which the FIG. 29 is already placed such that it is situated partly in the plastic mass 30 but protrudes upward therefrom with a certain part. After curing of the plastic 30 a complementary hemispherical object 34 is prepared by pouring plastic 30 into mould cavity 33. The finished object 32 is then placed on object 34 as according to arrow 35 whereby the upper part of FIG. 29 is immersed in the still liquid plastic 30. Use can for instance also be made in this case of a certain overmeasure of plastic whereby this plastic, which also serves as glue, is pressed outward through the gap between the flat end surfaces 36, 37 of the objects 34, 32. The objects 32, 34 are positioned exactly by respectively the peripheral groove 38 and the annular protrusion 39 having a shape complementary thereto such that the objects can together form a spherical shape, as drawn in FIG. 4c.

Attention is drawn to the fact that for instance one of the surfaces 36, 37 can carry information, for instance a number. Accordingly, the objects in question can be collected and it can be easily determined that for instance a series for purchase is wholly complete.

FIG. 4c shows the spherical completed object 39. It is noted that due to the magnifying effect of the glass encapsulation 32, 34 the FIG. 29 is perceived in greatly magnified manner from the outside.

What is claimed is:

1. A method for wholly enclosing an object with a spherical, transparent encapsulation, comprising the steps of:

(a) providing an object which has a degradation temperature;

(b) arranging the object in a spherical mould cavity, the shape of which corresponds with a desired spherical shape of encapsulation;

(c) providing a transparent encapsulating material which melts at a melting temperature lower than said degradation temperature;

(d) causing the encapsulating material to melt by heating and carrying thereof into the mould cavity;

(e) causing the encapsulating material to cool to below the melting temperature; and (f) opening the mould cavity and removing the solidified spherical moulded article, wherein prior to step (d) the object is carried by a support including a transparent material which melts at a melting temperature lower than said degradation temperature and which is substantially homogeneously fusable with the encapsulating material during step (d).

2. The method as claimed in claim 1, wherein the encapsulating material is glass.

3. The method as claimed in claim 2, wherein the support includes glass.

4. The method as claimed in claim 1, including performing step (a) with an object of ceramic material.

5. The method as claimed in claim 1, including performing step (a) with an object of metal.

6. The method as claimed in claim 5, including performing step (a) with an object of aluminium.

7. The method as claimed in claim 4, including at least partly covering the object with a colored coating.

8. The method as claimed in claim 4, including at least partly covering the object with an enamel coating.

9. The method as claimed in claim 4, including at least partly glazing the object with a colored coating.

10. The method as claimed in claim 5, including at least partly covering the object with a colored coating.

11. The method as claimed in claim 5, including at least partly covering the object with an enamel coating.

12. The method as claimed in claim 5, including at least partly glazing the object with a colored coating.

13. The method as claimed in claim 6, including at least partly anodizing the object with at least one color.

* * * * *